(No Model.) 4 Sheets—Sheet 1.

A. W. MESTON.
REGULATOR FOR ELECTRIC MOTORS.

No. 372,231. Patented Oct. 25, 1887.

Witnesses
Inventor
Alexander W. Meston
By his Attorney F. W. Ritter

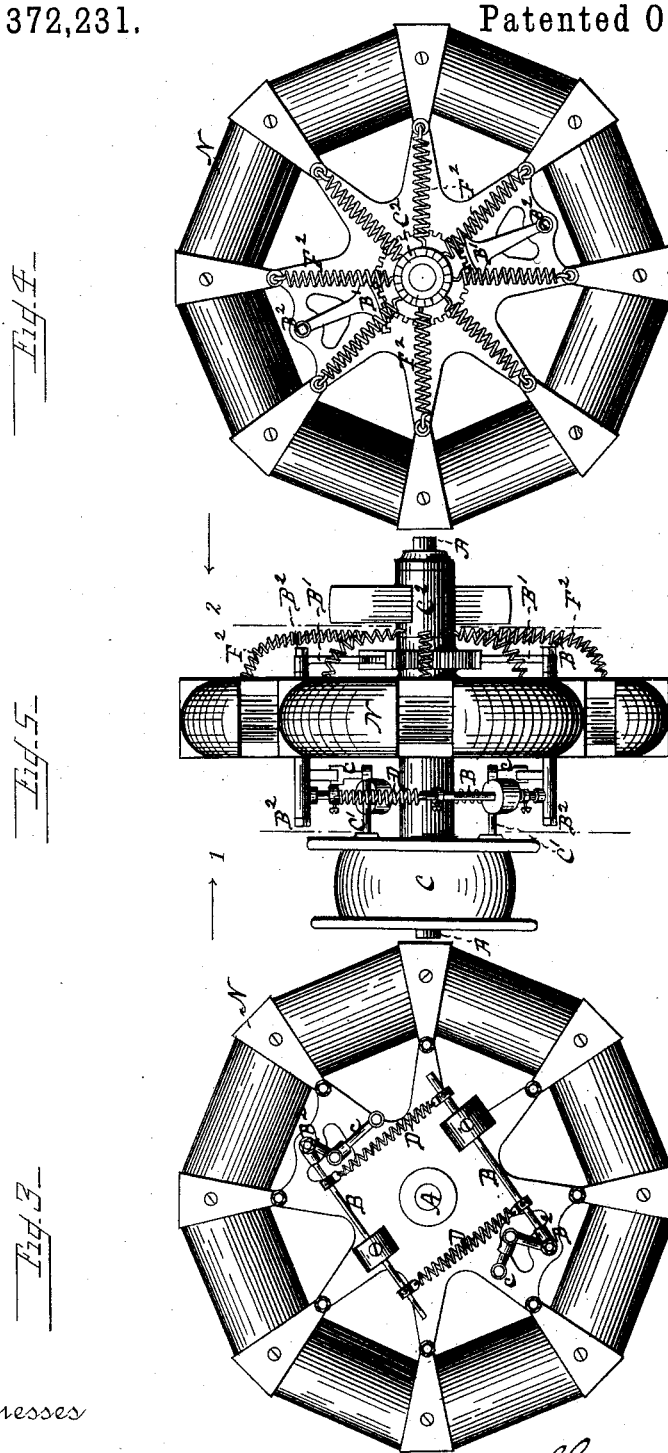

(No Model.) 4 Sheets—Sheet 3.
A. W. MESTON.
REGULATOR FOR ELECTRIC MOTORS.
No. 372,231. Patented Oct. 25, 1887.
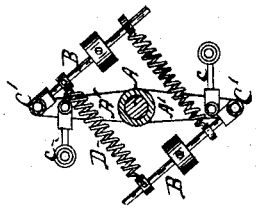
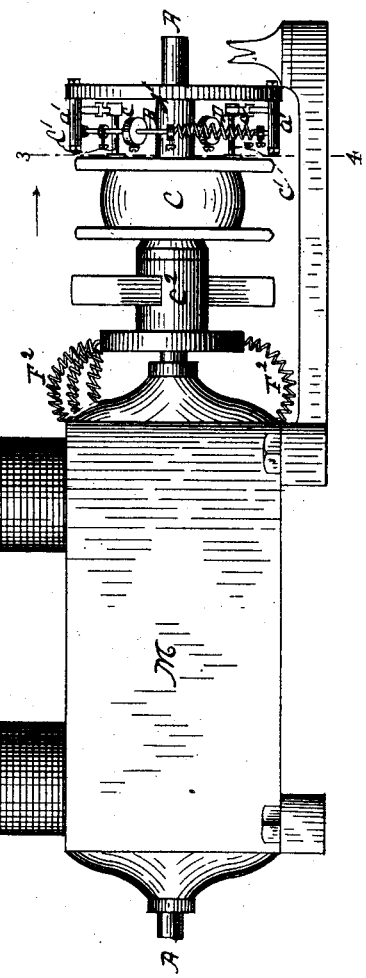
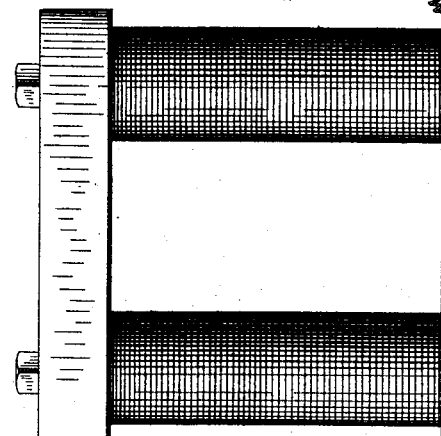
Witnesses
G. A. Tauberschmidt
Edwin S. Clarkson
Inventor
Alexander W. Meston
By his Attorney F. W. Ritter (No Model.) 4 Sheets—Sheet 4.

A. W. MESTON.
REGULATOR FOR ELECTRIC MOTORS.

No. 372,231. Patented Oct. 25, 1887.

Witnesses
G. A. Tauberschmidt
Edwin S. Clarkson

Inventor
Alexander W. Meston
By his Attorney F. W. Ritter

UNITED STATES PATENT OFFICE.

ALEXANDER W. MESTON, OF ST. LOUIS, MISSOURI, ASSIGNOR OF ONE HALF TO J. H. CLARK, OF SAME PLACE.

REGULATOR FOR ELECTRIC MOTORS.

SPECIFICATION forming part of Letters Patent No. 372,231, dated October 25, 1887.

Application filed March 1, 1887. Serial No. 229,333. (No model.)

*To all whom it may concern:*

Be it known that I, ALEXANDER W. MESTON, a subject of the Queen of Great Britain and Ireland, residing at St. Louis, in the State of Missouri, have invented certain new and useful Improvements in Electric Motors; and I hereby declare the following to be a full, clear, and exact description of the same, reference being had to the accompanying drawings, wherein like letters refer to like parts wherever they occur.

This invention relates to improvements in the application to electric motors of the governor for electric motors described in the specification forming part of Letters Patent No. 353,367, dated November 30, 1886.

The object of the invention is to simplify the construction of said governor where it is applied to govern the motor by shifting the commutator, and consequently the poles of the armature, with relation to the field-poles, and I attain this object by a novel arrangement of the existing parts of the motor in conjunction with and using only part of the mechanism described in the specification of the patent referred to. The action of the governor, as hereinafter described, is precisely as set forth in the said specification, the principle being the same, and the special advantage of this improvement in the governor is simplicity of construction gained by utilizing, to form part of the governor, certain parts which are inherent to all motors. By doing this the governor is rendered more compact, is cheaper to construct, and is more sensitive and efficient, as, being thus simplified, the friction of the parts is greatly lessened. The methods which I employ for accomplishing this are illustrated in the accompanying drawings, wherein—

Figure 2:
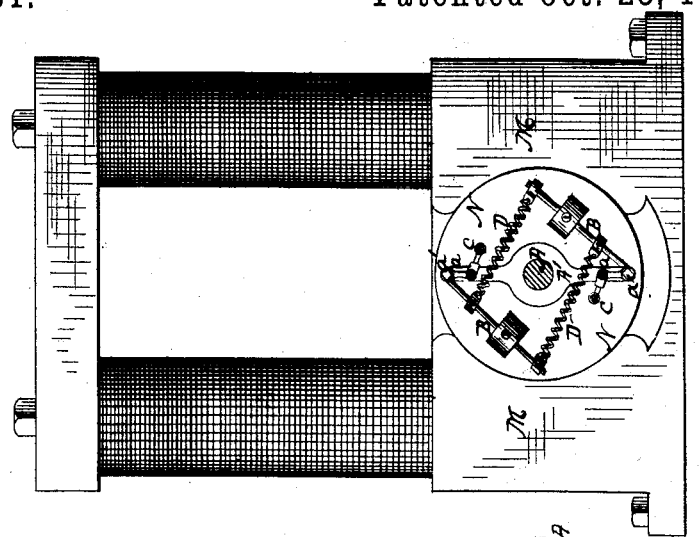
Figure 1:
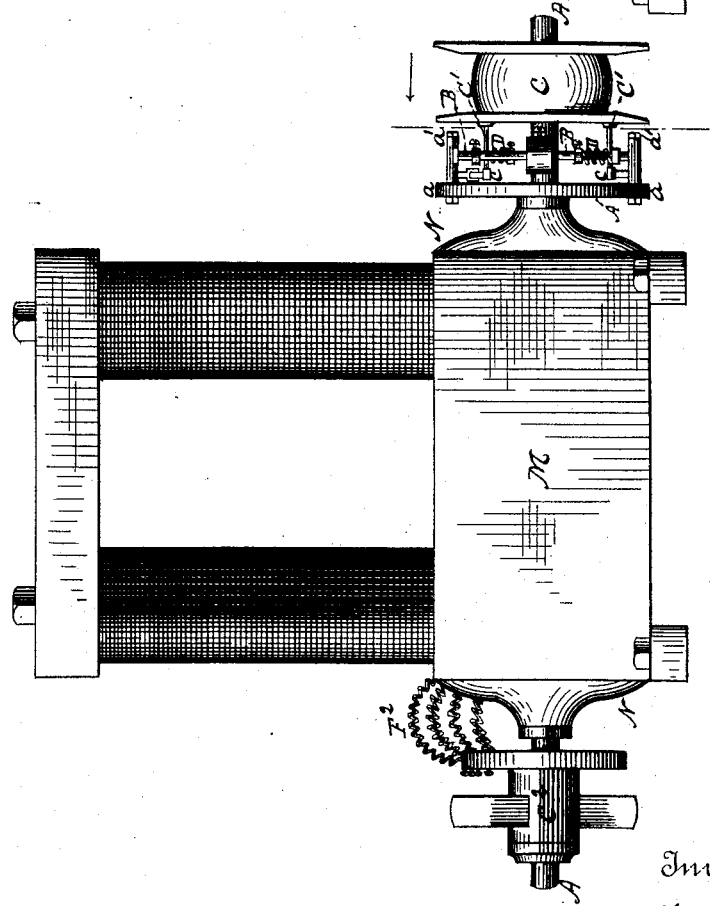
Figure 9:
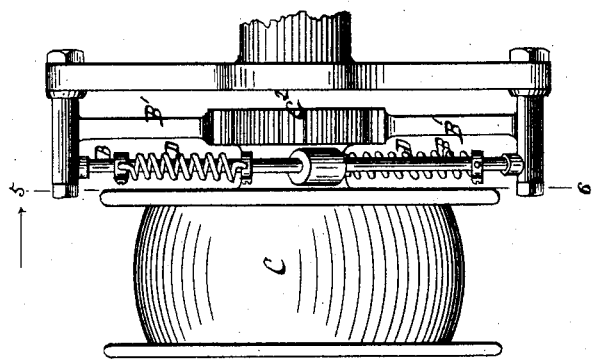
Figure 8:
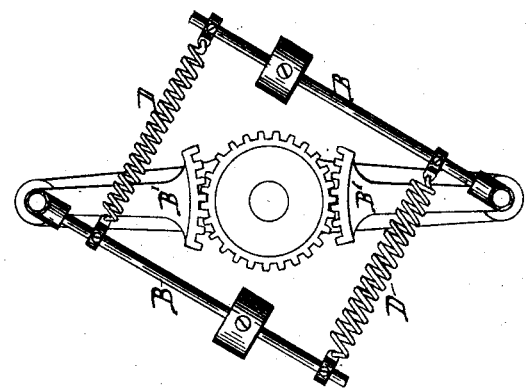
Figures 10, 11:
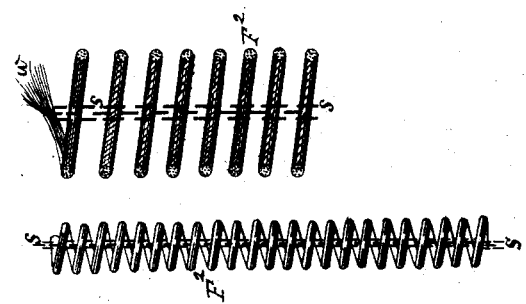

Figure 1 is a side elevation of a motor with my governor combined. Fig. 2 is an end elevation of same, looking in the direction of the shaft, with pulley off to show governor. Fig. 3 is an end elevation of an armature and shaft with governor combined, looking in the direction of shaft from 1 to 2, with pulley off to show governor. Fig. 4 is an end elevation of said armature and shaft with governor combined, looking in the direction of shaft from 2 to 1. Fig. 5 is plan view of said armature and shaft with governor combined. Fig. 6 is a side elevation of a motor with governor combined. Fig. 7 is an end section of governor through the line 3 4. Figs. 8 and 9 show a method of connecting the pulley with the governor arms by means of toothed sector-arms meshing with gear-teeth cut on the hub of said pulley, Fig. 9 being a plan of the governor with the pulley thus connected, and Fig. 8 being a section through the line 5 6 in Fig. 9. Figs. 3, 4, and 5 illustrate a modification of the combination shown in Figs. 1 and 2. Figs. 6 and 7 illustrate a further modification of the same. Figs. 10 and 11 are enlarged detail views of the flexible connections between the commutator and armature-coils.

Referring to Figs. 1 and 2, M represents the field-magnets of the motor, and N the armature. A is the motor-shaft, to which is rigidly secured the pulley C and the commutator $C^2$. Mounted to turn freely upon the shaft A is the armature N, to which is fastened the spider A', the arms $a$ of which are provided at their outer ends with journal-studs $a'$, upon which are mounted the governor-arms B, having the usual weights at their free ends, as shown. Projecting from the inner face of the pulley C are journaled posts C', said posts being connected with the governor-arms B by means of links $c$. Extending from the outer end of each of the governor-arms B to the inner end of the opposite arm are the coiled springs D, the stress of which is exerted to draw the governor-arms inward toward the shaft, which movement is communicated, through the links $c$, journaled posts C', pulley C, and shaft A of the motor, to the commutator $C^2$, changing its position with regard to the armature, which consequently, by changing the relative position of the field and armature poles, changes the power of the motor. The flexible connections $F^2$ convey the current from the sections of the commutator to the coils of the armature without impeding the movement of the commutator with relation to the armature necessary to fully regulate the power of the motor. The power of the springs D, transmitted through the governor-arms B to the pulley C, can be adjusted by moving said springs to different positions upon said arms, as when they are placed near the outer ends of the governor-arms B the springs have a greater leverage through said arms upon the pulley C than when they are placed nearer the journal-studs $a$. The centrifugal power of the weights, exerted in opposition to said springs, can be adjusted in the same manner. With the springs and weights near the outer end of said governor-arms B, it requires a greater power applied at the pulley to move the governor-arms B, and consequently the commutator $C^2$, a certain distance than when they are placed nearer the journal-studs $a$. In this way the governor can be adjusted to suit different maximum powers or efficiencies of the motor.

From the foregoing it will be seen that any movement of the governor-arms B, either toward or from the shaft, will be communicated, through the links $c$, journaled posts C', pulley C, and shaft A, to the commutator $C^2$, changing its position and the power of the motor, as before explained. It will also be seen that any increase of load placed upon the pulley C will tend to draw the governor-arms B inward toward the shaft, which will move the commutator to a position which gives the motor an increase of power necessary to maintain the speed thereof under this increased load. A decrease of load would in the same manner allow the governor-arms B, influenced to do so by the centrifugal force of the weights at their free ends, to fly outward until checked by the increase in the opening-pull of the springs D, caused by said outward movement. This will move the commutator to a position where the power of the motor is lessened to suit the decreased load.

When the motor-shaft is in motion, the centrifugal force of the weights on the governor-arms will move said arms outward against the progressively-increasing pull of the springs D, thus shifting the commutator $C^2$ and progressively lessening the power of the motor in proportion to the outward movement of said arms until without a load the pull of the springs balances the centrifugal force of the weights. In this position the efficiency of the motor or its power to lift a load is *nil*, and this condition can only exist when there is no load, because the resistance of a load would be added to the pull of the springs upon the governor-arms, thus changing their position and that of the commutator $C^2$ and increasing the power of the motor. When the shaft is at rest, as there is no centrifugal force exerted, the springs D, even in their relaxed condition, will hold the governor-arms in toward the shaft, and in this position said arms will have moved the commutator $C^2$ to a position to obtain the greatest efficiency of the motor; hence the maximum power of the motor is exerted in starting.

It will be seen from the foregoing that the efficiency of the motor or power available for lifting a load is the whole centrifugal force of the weights minus the force exerted by the pull of the springs, and as the pull of the springs is at the minimum when the governor-arms are nearest the shaft the greatest power of the motor is then reached and should equal the resistance offered by the maximum load.

While the motor is running an increase of load would retard the pulley, and as this pulley is connected to the spider and armature by means of the journal-posts C', links $c$, and the governor-arms and the journal-studs $a'$, said governor-arms will first feel the increase of load and be drawn inward, thus shifting the commutator $C^2$ to increase the power of the motor (by changing the relative position of the armature and field-poles) before the speed of the motor-shaft can change; and if the power of the motor (or the current) should decrease while the load remains the same a similar movement of the governor-arms and commutator $C^2$ will result. A reverse action will of course take place upon any decrease of the load or increase of the power of the motor.

Referring to the modification illustrated in Figs. 3, 4, and 5, the pulley C and the commutator $C^2$ are mounted to turn freely upon the shaft A, to which the armature N is rigidly secured. The pulley C is connected with the armature through the journaled posts C', links $c$, governor-arms B, and journal-shafts $B^2$, to which said journal-shafts $B^2$ and said governor-arms B are rigidly secured. The movement of the governor-arms B is communicated by said journal-shafts $B^2$ to the toothed sector-arms B', which are also rigidly secured thereto, and which mesh with the gear-teeth formed upon the elongated hub of the commutator $C^2$. As in Figs. 1 and 2, the governor-arms B have mounted upon their free ends the usual weights, and have the stress of the coiled springs D, tending to draw them inward toward the shaft A of the motor. Thus any movement of the pulley upon the shaft or of the governor-arms, caused by any change of power or load, will shift the commutator, producing the same results before specified in explanation of Figs. 1 and 2. $F^2$ represents the flexible connections connecting the sections of the commutator with the coils of the armature.

In Figs. 6 and 7 the commutator $C^2$ and the pulley C form one piece, or are rigidly fastened together. They are mounted to turn loosely upon the shaft A, and are connected, through the journaled posts C', links $c$, and journal-studs $a'$, to the spider A', which is secured to the shaft A of the motor. The armature N is also secured to the shaft A. Upon any change of load or power a movement of the governor-arms takes place, which moves the pulley C and commutator $C^2$ upon the shaft with relation to the armature N, thus changing the power of the motor, as before specified. As to the other views, $F^2$ represents the flexible connections connecting the sections of the commutator with the coils of the armature.

Figs. 8 and 9 show a method of connecting the pulley to the governor-arms by means of the toothed sector-arms B', rigidly secured to said governor-arms and meshing with teeth formed on the elongated hub $c^2$ of the pulley C. By changing the relative size of the radius of the sector-arms and the diameter of the hub of the pulley C, the movement of the governor-arms may be changed with relation to the movement of the pulley, and if it is desired to magnify the movement of the governor-arms with regard to that of the pulley it is only necessary to make the diameter of the hub $c^2$, whereon the teeth are formed, smaller and the radius of the sector-arms correspondingly larger. In the methods hereinbefore illustrated this means of connecting the pulley with the governor-arms may be used instead of connecting the said pulley by means of the journaled posts C' and links c.

For conveying the current from the commutator-sections to the armature-coils, I prefer to use connections which are constructed in the following manner: I take a number of small copper wires, $w$, (see Fig. 11)—say No. 30—sufficient to carry the current, and twist them together. I then wind this twisted strand upon a mandrel, forming a closely-coiled spiral spring, $F^2$. (See Fig. 10.) From one end of this coil, running loosely through its interior to the other, I fasten a small chain, $s$, which should be slightly longer than the coil. This keeps the coil in place and prevents it from flying outward by reason of its own centrifugal force, without in any way affecting the flexibility of the coil. Such a connection, I have found, gives the maximum flexibility for the amount of conducting metal.

I am aware that the use of a centrifugal governor to control the power of an electric motor by shifting the commutator is not new; but in the only instances of such use of which I have knowledge these governors operated only in response to changes in the speed of the shaft or armature on which they are mounted and cannot operate to prevent a change in the speed of said shaft or armature before such change occurs.

I am also aware that it has been proposed to interpose springs between the driving pulley and armature to control the position of the brushes upon the commutator; but the method of using the change of load alone keeps the speed uniform only at a certain uniform current, and will not even do this unless the movement caused by a change of load is correctly proportioned and applied to sufficiently change the power of the motor to meet such change of load. As it would be practically impossible to correctly proportion and apply this movement, and as this error would cause fluctuations in the speed, such a method of governing would be most imperfect in its operation. By connecting the pulley or other power-transmitting device to the governor-arms, and thus causing the load to influence directly the movement of the centrifugal governor, and through it the commutator, as specified, a constant speed under any change of load or in the absence of any load is always maintained, and any such mechanical error of proportion between the movement of the pulley and the change of power caused thereby is corrected.

Having thus described the nature, operation, and advantages of my invention, what I claim, and desire to secure by Letters Patent, is—

1. In combination, in an electric motor, a pulley or other power-transmitting device loose upon the shaft of said motor, an armature fastened upon said shaft, a centrifugal governor connecting said armature with said pulley and controlled thereby, and a commutator controlled by said governor and adapted to be shifted by said governor with relation to the armature without disturbing the electrical connections between the sections of said commutator and the coils of said armature, substantially as and for the purposes specified.

2. In combination, in an electric motor, a pulley or other power-transmitting device and a commutator forming one piece or fastened rigidly together loose upon the shaft of said motor, said commutator being operated by said pulley, an armature fastened upon said shaft and adapted to move with relation to said commutator without disturbing the electrical connections between the sections of said commutator and the coils of said armature, a spider fastened upon said shaft, and a centrifugal governor connecting said pulley with said spider and controlled by said pulley, as and for the purposes specified.

3. In combination, in an electric motor, a pulley or other power-transmitting device loose upon the shaft of said motor, an armature fastened upon said shaft, a centrifugal governor connecting said armature with said pulley, a commutator controlled by said governor, and flexible connections connecting the sections of said commutator with the coils of said armature, as and for the purposes specified.

4. In combination, in an electric motor, a pulley or other power-transmitting device and a commutator forming one piece or fastened rigidly together and loose upon the shaft of said motor, said commutator being controlled by said pulley, an armature fastened upon said shaft, flexible connections connecting the sections of said commutator with the coils of said armature, a spider fastened upon said shaft, and a centrifugal governor connecting said pulley with said spider, said governor controlled by said pulley, as and for the purposes specified.

5. In combination, in an electric motor, a pulley or other power-transmitting device loose upon the shaft of said motor, an armature fastened upon the shaft, governor-arm pivoted upon said armature, coiled springs operating in opposition to said governor-arms, links and journaled posts connecting said governor-arms with said pulley, said governor-arms controlled by said pulley, a commutator loose upon the shaft of said motor and controlled by said governor-arms, and flexible connections connecting the sections of said commutator with the coils of said armature, all as and for the purposes specified.

6. In combination, in an electric motor, a pulley or other power-transmitting device loose upon the shaft of said motor, an armature fastened upon said shaft, governor-arms pivoted on said armature, coiled springs operating in opposition to said governor-arms, links and journaled posts connecting said governor-arms with said pulley, said governor-arms controlled by said pulley, a commutator loose upon the shaft of said motor, journal-shafts and sector-arms connecting said commutator with said governor-arms, said commutator controlled by said governor-arms, and flexible connections connecting the sections of said commutator with the coils of said armature, all as and for the purposes specified.

7. In combination, in an electric motor, a pulley or other power-transmitting device and a commutator forming one piece or fastened rigidly together and loose upon the shaft of said motor, said commutator being operated by said pulley, an armature fastened upon said shaft, flexible connections connecting the sections of said commutator with the coils of said armature, a spider fastened upon said shaft, governor-arms pivoted thereon, coiled springs operating in opposition to said governor-arms, and links and journaled posts connecting said governor-arms with said pulley, said governor-arms controlled by said pulley, as and for the purposes specified.

8. In combination, in an electric motor, a pulley or other power-transmitting device loose upon the shaft of said motor, an armature fastened upon said shaft, governor-arms pivoted on said armature, coiled springs operating in opposition to said governor-arms, toothed sector-arms fastened to said governor-arms and connecting said governor arms with said pulley, said governor-arms controlled by said pulley, a commutator loose upon the shaft of said motor, journal-shafts and toothed sector-arms connecting said commutator with said governor-arms, said commutator controlled by said governor, and flexible connections connecting the sections of said commutator with the coils of said armature, all as and for the purposes specified.

9. In combination, in an electric motor, a pulley or other power-transmitting device and a commutator forming one piece or rigidly fastened together loose upon the shaft of said motor, said commutator being operated by said pulley, an armature fastened upon said shaft, flexible connections connecting the sections of said commutator with the coils of said armature, a spider fastened upon said shaft, governor-arms pivoted thereon, coiled springs operating in opposition to said governor-arms, and toothed sector-arms fastened to said governor-arms, connecting said pulley with said governor-arms, said governor-arms being controlled by said pulley, as and for the purposes specified.

10. In combination, in an electric motor, the armature and commutator, one of which is loose and adapted to move on the shaft of said motor with relation to the other, flexible springs formed of twisted strands of copper wire, and chains arranged in the interior of said coiled springs and fastened to the ends thereof, said springs connecting the sections of said commutator with the coils of said armature, substantially as and for the purposes specified.

11. In combination, in an electric motor, the armature fastened upon the shaft of said motor, the commutator loose upon said shaft, said commutator being adapted to move upon said shaft with relation to said armature, flexible coiled springs formed of twisted strands of copper wire, and chains in the interior of said coiled springs and fastened to the ends thereof, said springs connecting the sections of said commutator with the coils of said armature, as and for the purposes specified.

In testimony whereof I affix my signature, in presence of two witnesses, this 26th day of February, 1887.

ALEXANDER W. MESTON.

Witnesses:
WM. MORGAN,
JAMES L. SMITH.